United States Patent Office 3,836,594

Patented Sept. 17, 1974

3,836,594

HYDROCARBON CONVERSION PROCESS AND SILICA AND/OR ALUMINA-CONTAINING CATALYST THEREFOR

Roy John Sampson and Ivan James Samuel Lake, both of Norton Hall, The Green, Norton, Stockton-on-Tees, England No Drawing. Continuation of application Ser. No. 142,411, May 11, 1971, which is a continuation-in-part of application Ser. No. 91,194, Nov. 19, 1970, both now abandoned. This application Apr. 23, 1973, Ser. No. 353,621

Claims priority, application Great Britain, Nov. 27, 1969, 58,157/69

Int. Cl. C07c 5/24

U.S. Cl. 260—668 A 13 Claims

ABSTRACT OF THE DISCLOSURE

Hydrocarbon conversion processes catalysed by silica, alumina or silica/alumina catalysts, are improved by exposing the catalyst before use to liquid or supercritical water at above 100° C.

This invention relates to chemical processes and catalysts and is a continuation of application Ser. No. 142,411, filed May 11, 1971, which is a continuation-in-part of Ser. No. 91,194, filed Nov. 19, 1970, both of which are now abandoned.

The invention comprises a hydrocarbon conversion process involving a silica, alumina, or silica/alumina catalyst or catalyst support in which the performance of the catalyst is improved by exposing it to liquid water at a temperature in excess of 100° C. or to supercritical water at elevated pressure before the process is carried out.

The process may be catalytic cracking, especially of hydrocarbon materials, e.g. a crude oil fraction, whose boiling range is about that of gasoline, isomerisation, especially of olefines, a polymerisation or oligomerisation reaction, especially the production of dimers or trimers of lower olefines such as propylene and the butenes, alkylation of aromatic compounds with olefines, and (especially when the catalyst contains subsequently introduced rare earth metal ions) hydrocracking processes.

According to a preferred form of the invention alkyl benzenes are isomerised by contacting them at an elevated temperature with a silica, alumina or silica/alumina catalyst which has been exposed to liquid or supercritical water as aforedescribed.

When the catalyst carries or includes a material additional to the silica, alumina or silica/alumina (for example, if the catalyst is to be used in hydro-isomerisation, a noble metal which may be platinum or palladium) the water treatment is preferably carried out before the additional material is introduced.

It is preferred that the catalyst should be a silica/alumina catalyst, especially a catalyst of the silica/alumina cracking type. It is preferred to use a synthetic alumino-silicate.

Suitable silica/alumina catalysts have an analysis of 1 to 40% and preferably from 6 to 30% by weight of alumina, the balance being substantially silica.

The catalyst before the exposure to liquid water preferably has a surface area in the range 200 to 700 square metres/gram, and preferably 350 to 700 square metres/gram. Its mean pore size is preferably at least 10 A., more preferably at least 20 A., and yet more preferably at least 40 A. and may be in the range 10 to 200 A.

In general the mean pore size of the catalyst increases during the treatment by, for example, 20 to 300 A. The severity and duration of the conditions under which the exposure of the catalyst to the water occurs may be adjusted in terms of the desired increase in pore size to be obtained. Desired pore sizes of the product may be, for example, 50 to 400 A. and are normally 80 to 250 A., and preferably 100 to 250 A. It is believed that other changes also occur in the catalysts during exposure to water.

It is preferred to isomerise mixtures of alkyl benzenes having at most 4 carbon atoms in each alkyl group, especially those having two alkyl groups, for example, the xylenes. According to a preferred form of the invention one or more xylenes containing less than equilibrium concentration of paraxylene are isomerised according to this invention to produce a product having a higher content of paraxylene.

In the production of paraxylene, paraxylene may be separated from mixtures containing, for example, 12 to 30% by weight of paraxylene together with orthoxylene, metaxylene and/or ethyl benzene (for example, by cooling to crystallise the paraxylene, which is separated) and the remainder of the mixture is isomerised to increase the paraxylene concentration to, for example, 12 to 23% by weight so that more paraxylene may be separated from it. As the equilibrium concentration of paraxylene in the mixtures after isomerisation is normally found to be at most about 23% it is necessary in order to convert a satisfactory proportion of the xylenes to paraxylene to subject them to isomerisation a number of times. This problem is aggravated if the separation is by crystallisation, in that it is normally difficult to reduce the paraxylene concentration of such mixtures below 8% to 10% by weight because of the formation of eutectics. If the separation is, for example by an adsorption process, it may be possible to recover a greater proportion of the paraxylene but it is still necessary to carry out a number of isomerisations to convert a satisfactory proportion of the xylenes to paraxylene. In the course of the isomerisation, disproportionation, resulting in the formation of toluene and trimethyl benzenes from the xylenes, tends to occur and this may reduce the yield of paraxylene from the mixture appreciably.

In the isomerisation of xylenes the prior treatment according to the invention of the catalyst generally reduces the tendency for disproportionation to occur. It may also reduce carbon lay-down on the catalyst and may also increase its activity.

Isomerisation of xylenes is preferably carried out at a temperature in the range 200° to 600° C., and preferably 300° to 500° C. It is preferably carried out at a pressure of 0.5 to 50 atmospheres and more preferably at a pressure in the range 1 to 5 atmospheres. It may be carried out if desired in the presence of small amounts of, for example, steam or ammonia.

In hydro-isomerisation of alkyl benzenes, especially xylenes, the process is preferably carried out at a temperature in the range of 350° to 650° C. and preferably 420° to 500° C. at a total pressure of 4 to 70 bars absolute and preferably 8 to 30 bars absolute in the presence of a catalyst which comprises a noble metal which is preferably platinum or palladium supported on a silica, alumina or silica/alumina support which support has been improved by treatment as aforesaid.

The catalyst suitably contains 0.01 to 5% and preferably 0.1 to 1% by weight of the noble metal, which may be present as such or as a compound which is converted to the metal under the conditions of the process, for example, an oxide. The noble metal may be introduced by impregnating the catalyst support with a solution of a compound of the noble metal, for example, an aqueous solution. The compound is suitably decomposed to metallic form on the catalyst, for example, by hydrogen treatment. Suitable compounds include soluble salts, for example, halides and complexes, for example, the amine complexes.

The hydrocarbon weight hourly space velocity in the process is normally in the range 0.5 to 15.

The catalyst support before and after exposure to liquid water preferably has similar characteristics to those disclosed above.

According to a preferred form of the invention one or more xylenes containing less than an equilibrium concentration of paraxylene are hydro-isomerised according to the invention to produce a product having a higher concentration of paraxylene. The xylenes fed to the process may contain substantial quantities of ethyl benzene as this tends to be converted to xylenes in the course of the process.

The mole ratio of hydrogen to hydrocarbon is normally in the range 2:1 to 20:1, and more preferably in the range 5:1 to 10:1.

Novel catalysts produced by the aforedescribed water treatment are included in this invention. These are the silica-alumina and alumina catalysts and supports and cataylsts comprising such supports.

It is believed that the catalytic performance of alumina and silica/alumina catalysts is improved in a wide variety of reactions by exposing them to liquid water at a temperature in excess of 100° C. The treated catalysts may be used in the reaction of alcohols with ammonia to give amines, and as supports in hydrocarbon oxidation catalysts.

The water to which the catalyst is exposed may in some cases contain acid or alkali. The exposure preferably takes place at a temperature of 100 to 374° C. (the critical point of water) and is at a sufficient pressure to maintain the water in the liquid phase (which is normally between 1 bar and 220 bars). More commonly, pressures in the range 2 to 100 bars and temperatures of 130 to 270° C. are used.

The time of exposure is normally 5 minutes to 500 hours, and is more commonly in the range 30 minutes to 100 hours.

EXAMPLE 1

18 grams of a silica/alumina catalyst having an analysis of 10% alumina and 90% silica, a surface area of 450 square metres/gram, a mean pore diameter of 53 A. and formed into 4 millimetre granules was added to 140 ml. of distilled water in a 240 ml. autoclave. The autoclave was heated to 100° C. and opened to permit emergence of steam thus removing any air present. The loss of water involved was negligible. The autoclave was then heated to 197° C. at which the internal pressure was 12.7 atmospheres and it was maintained at this temperature for 4½ hours.

The autoclave was then cooled and opened and the catalyst filtered from the water and dried in air at 200° C. for 4 hours. The treated catalyst had a surface area of 196 square metres/gram and a mean pore diameter (calculated from the surface area and pore volume) of 115 A. The granule size was substantially unchanged. The surface area and mean pore diameter of the catalyst both before and after treatment were obtained from nitrogen absorption isotherms interpreted by the Brunauer, Emmett and Teller procedure as described in the Journal of the American Chemical Society, Volume 60, page 309 (1938), and the helium/mercury density method of pore volume estimation.

A sample of catalyst as treated above (4 grams) and a sample of the original catalyst (4 grams) were evaluated as follows:

Each catalyst was packed into a tubular reactor which was maintained at 550° C. Air was passed through for 14 hours. The reactor was then flushed with nitrogen for 30 minutes and the reactor was then cooled to 450° C.

Orthoxylene (97.4% pure, containing also 2% toluene and 0.6% metaxylene) was fed to the reactor as vapour at a temperature of 450° C. and at a rate of 12 grams per hour.

The effluent from the reactor had the following composition after 6 hours.

| Material present in product | Moles percent in product | |
|---|---|---|
| | Untreated catalyst | Treated catalyst |
| Paraxylene | 2.7 | 2.7 |
| Metaxylene | 15.9 | 15.9 |
| Benzene | 0.3 | 0.2 |
| Toluene | 2.7 | 2.4 |
| Trimethyl benzenes | 0.9 | 0.5 |
| Orthoxylene | 78.1 | 78.9 |

It will be observed that the treated catalyst produced less disproportionation of xylenes to benzene, toluene and trimethyl benzenes than untreated catalyst.

EXAMPLE 2

In three separate runs, each of 60 hours total duration, a xylenes feedstock having the composition shown in Table 1 was subjected to isomerisation using a continuous fixed bed catalyst testing unit of conventional design. The temperature, pressure and feed-rate were continuously controlled. The temperature was held at substantially 450° C.; the pressure throughout was 7.5 p.s.i.g., and the weight hourly space velocity (WHSV) of the feed was varied such that the reaction product contained a given substantially constant proportion (≈17.5% by weight) of paraxylene.

TABLE I

Feed composition (percent by weight):

| Component | Percent |
|---|---|
| p-Xylene | 9.3±0.1 |
| m-Xylene | 55.0±0.3 |
| o-Xylene | 26.0±0.4 |
| Ethyl benzene | 3.1±0.1 |
| Toluene | 0.66±0.06 |
| Other aromatics (especially trimethyl benzene) and aliphatics (especially nonane) | Remainder |

The catalysts used in the three runs were derived from the same basic stock of commercially-supplied catalyst as that described in Example 1. In one case (catalyst A), the catalyst was not subjected prior to use to a treatment with water in accordance with this invention; in the other two cases (catalysts B and C), the catalysts were so prior-treated. The hydrothermal treatment applied to catalyst B was precisely as described in Example 1, that is to say, in an autoclave at a temperature of 197° C. for a period of 4½ hours and using, of course, the same relative proportions of catalyst and water, followed by flushing with nitrogen at reaction temperature. The hydrothermal treatment applied to catalyst C differed from the treatment given to catalyst B in that the temperature of hydrothermal treatment here was 208° C.

During each run, the isomerisation reaction was interrupted for catalyst regeneration to remove solid carbonaceous deposits after successive 12 hourly periods. The regeneration procedure consisted in passing a stream of oxygen diluted with nitrogen through the catalyst bed, and the bed temperature was prevented from rising above 550° C. by controlling the oxygen content of the gas stream. The maximum oxygen content of the gas stream was 21% by volume.

Throughout the entire 60 hours period catalyst performance remained substantially steady in each case, apart from an initial slight decline in catalyst activity following start-up, which is a common observation in catalytic reactions.

Details of the results obtained in each run during the final 12 hour period are given in the following Table II, figures being weight percentages excepting the figures for weight hourly space velocity (WHSV).

TABLE II

| | Proportion of p-xylene in product | Proportion of xylenes converted to other materials | WHSV[1] |
|---|---|---|---|
| Catalyst A: | | | |
| After 3 hours on line | 17.6 | 8.6 | |
| After 6 hours on line | 17.4 | 7.7 | |
| After 9 hours on line | 17.4 | 6.9 | 1.57 |
| After 12 hours on line | 17.2 | 6.6 | |
| Average | 17.4 | 7.5 | |
| Catalyst B: | | | |
| After 3 hours on line | 17.8 | 3.9 | |
| After 6 hours on line | 17.7 | 3.9 | |
| After 9 hours on line | 17.6 | 3.7 | 1.80 |
| After 12 hours on line | 17.3 | 3.6 | |
| Average | 17.6 | 3.8 | |
| Catalyst C: | | | |
| After 3 hours on line | 17.7 | 4.1 | |
| After 6 hours on line | 17.5 | 3.9 | |
| After 9 hours on line | 17.5 | 3.7 | 1.28 |
| After 12 hours on line | 17.4 | 3.7 | |
| Average | 17.5 | 3.8 | |

[1] Weight hourly space velocity.

A significant additional feature of the results obtained in these runs was that the treated catalysts B and C gave rise to a significantly lower (~50%) lay-down of solid carbonaceous deposits on the catalysts than the untreated catalyst A.

It can be seen from these results that the treated catalysts gave better performance. Thus, both treated catalysts manifested greatly improved selectivity over the untreated catalyst, and catalyst B additionally showed higher activity.

EXAMPLE 3

A silica/alumina catalyst (40 grams) having an analysis of 10% alumina and 90% silica, a surface area of 443 square metres/gram, a mean pore diameter of 54 A. and formed into 4 mm. granules was added to 140 mls. of distilled water in a 240 ml. autoclave. The autoclave was heated to 100° C. and opened to permit emergence of steam thus removing any air present. The loss of water involved was negligible. The autoclave was then heated to 177° C. at which the internal pressure was 9.2 atmospheres and it was maintained at this temperature for 31 hours. The autoclave was then cooled and opened and the catalyst filtered from the water and dried in air at 200° C. for 4 hours. The treated catalyst had a surface area of 178 square metres/gram and a mean pore diameter of 122 A. The granule size was substantially unchanged (Catalyst D).

EXAMPLE 4

Another sample (40 grams) of the silica/alumina catalyst used in Example 3 was treated in a similar manner to that described in Example 3 except that the temperature was 170° C., the pressure 7.8 ats. and the time 4.5 hours. The resulting material had a surface area of 308 square metres/gram and a mean pore diameter of 67 A. (Catalyst E).

The catalysts treated as above and the starting material were evaluated as follows:

Each catalyst (12 grams) was packed into a tubular reactor and air was passed over it at 550° C. for 15 hours. The reactor was flushed with nitrogen for 30 minutes and then cooled to 450° C.

Orthoxylene (99.10% pure, containing 0.10% toluene, 0.10% paraxylene and 0.70% metaxylene) was fed to the reactor as vapour at a temperature of 450° C.

The effluent from the reactor in each case had the following composition after 6 hours:

| | Untreated catalyst | Catalyst D | Catalyst E |
|---|---|---|---|
| Feed rate, ml. hr.$^{-1}$ | 26.5 | 14.0 | 27.7 |
| Product composition (moles percent): | | | |
| Paraxylene | 9.6 | 8.8 | 9.2 |
| Metaxylene | 34.6 | 35.1 | 33.6 |
| Toluene | 4.0 | 2.1 | 2.5 |

Trimethyl benzenes also observed in amounts very similar to the corresponding amounts of toluene.

It will be observed that the treated catalysts brought about less disproportionation of orthoxylene than the untreated catalyst.

EXAMPLE 5

A sample of a commercial synthetic silica/alumina catalyst in the form of 3 mm. pellets and containing 15% alumina was treated with liquid water at 186° C. (1.2 bars pressure) for 4.5 hours. The changes in surface area and pore structure which resulted from this treatment were as follows:

| | Surface area, m.$^2$g.$^{-1}$ | Mean pore diameter A. |
|---|---|---|
| Before treatment | 480 | 43 |
| After treatment | 186 | 120 |

Twelve gram samples of both the treated material and the starting material were tested for orthoxylene isomerisation performance as follows:

Each sample was placed in a vertical tubular glass reaction vessel and heated at 550° C. in a stream of air for 15 hours. The air was flushed out with nitrogen and the system cooled to 450° C. Orthoxylene (99.2% pure containing 0.1% toluene, 0.09% paraxylene and 0.60% metaxylene) was passed through the catalyst as a vapour at a rate of 12.0 g./hour. The compositions of the product obtained after 6 hours on line over each of the catalysts were as follows:

| Component | Moles percent in product obtained over— Starting material | Treated material |
|---|---|---|
| Paraxylene | 16.60 | 11.16 |
| Metaxylene | 44.16 | 38.54 |
| Toluene | 11.65 | 2.88 |
| Paraxylene plus metaxylene toluene | 5.25 | 17.25 |

In each experiment trimethyl benzenes were also observed, the total number of moles being the same, within experimental error as the number of moles of toluene.

The above results clearly show that after treatment the catalyst was much more selective towards isomerisation relative to disproportionation. The heating of catalysts to 550° C. in air before use in Example 1, 4 and 5 gives results representative of the behaviour of catalysts under typical conditions of use in which such treatment formed during isomerisation. It is preferred not to subject the catalyst to such high temperatures when it is first charged to an industrial plant. Exposure of the catalyst to unnecessarily high maximum temperatures before or during use is preferably to be avoided.

EXAMPLE 6

A 40 g. sample of a commercial alumina catalyst in the form of ⅛ inch extrudates and having a surface area of 115 square metres/gram and a mean pore diameter of 105 A. was added to 140 ml. of distilled water in a 240 ml. autoclave, which was heated to expel air with a minimal loss of water, closed and heated to 197° C. at which the internal pressure was 12.7 bars and maintained under these conditions for 4½ hours.

The autoclave was then cooled, opened and the catalyst dried in air at 200° C. in an oven overnight.

The product had a surface area of 69 square metres/gram and a mean pore diameter of 130 A.

EXAMPLE 7

A commercial synthetic silica/alumina catalyst containing 10% $Al_2O_3$ was treated with liquid water at 205° C. for 4.5 hours. The table shows the changes in micromeritics brought about by this treatment.

90 g. samples of the treated catalyst and the starting material were each impregnated with 110 ml. of an aqueous solution containing chloroplatinic acid (0.68 g. platinum) and 4.2 ml. concentrated HCl. In each case the silica/alumina was left to soak in the impregnating solution for 15 hours, the remaining solution was then evaporated to dryness and finally the catalyst was calcined at 480° C., for 2 hours. The catalysts based on both untreated and treated silica/alumina contained 0.9% platinum by weight. In turn 50 ml. (32 g.) of each catalyst was diluted to 100 ml. with inert alumina spheres and packed in a stainless steel tubular reactor. The temperature was raised to 450° C. while purging with nitrogen. The catalyst was then reduced in hydrogen (479 $l./hr.^{-1}$) for 2 hours at 450° and 1 atmosphere total pressure.

The catalysts thus prepared were tested for the hydroisomerisation of orthoxylene as follows:

In each case orthoxylene (96.3% pure, containing 2.0% metaxylene, 0.4% paraxylene, 0.9% toluene and 0.4% non-aromatics—all analyses as moles percent) was fed to the reactor at a weight hourly space velocity of 7.8 g./g. catalyst/hour together with 450–480 $l./hr.^{-1}$ hydrogen (hydrogen:orthoxylene mole ratio 8:1). The catalyst bed was maintained at a temperature of 475/490° C. throughout the isomerisation and the total pressure at 15 bars absolute. In each case after the initial period on-line the compositions of the effluent streams were constant. The average compositions during the period between 24 and 48 hours on-line, are given in the table.

In the case of the treated catalyst the methane content of the effluent hydrogen was, within experimental error, equivalent to the number of methyl groups lost by hydrodealkylation. With the untreated catalyst the methane figure was slightly greater than that resulting from hydrodealkylation but the excess methane corresponded to no more than 0.15% of the total carbon fed.

Clearly the selectivity of the treated catalyst is much greater than that of the untreated catalyst.

| | Untreated | Treated |
|---|---|---|
| | Surface area, $m.^2g.^{-1}$ | |
| | 450 | 180 |
| Mean pore diameter (A.) | 54 | 116 |
| Moles percent in liquid effluent: | | |
| Benzene* | 1.2 | 1.4 |
| Toluene | 4.4 | 2.1 |
| Ethyl benzene | 0.5 | 0.6 |
| Paraxylene | 8.8 | 9.0 |
| Metaxylene | 30.5 | 32.3 |
| Orthoxylene | 52.6 | 53.8 |
| Trimethylbenzenes | 2.0 | 0.8 |
| Percent isomerisation; percent disproportionation plus percent hydrodealkylation | 5.6 | 11.6 |

*This figure includes naphthenes and $C_2$–$C_8$ hydrocarbons, though these are present in only trace amounts compared with the benzene itself.

What is claimed is:

1. In a process for isomerizing an alkyl benzene using a silica, alumina or silica/alumina catalyst or a catalyst supported on a silica, alumina or silica/alumina support, the step of improving the catalyst by exposing it to liquid water at a temperature in excess of 100° C. at elevated pressure before carrying out the process and then using the thus exposed catalyst to isomerize said alkyl benzene.

2. A process as claimed in claim 1 in which the catalyst is a silica/alumina cracking catalyst.

3. A process as claimed in claim 2 in which the silica/alumina cracking catalyst has an analysis of 1 to 40% by weight of alumina, the balance being substantially silica.

4. A process as claimed in claim 3 in which the catalyst before the exposure to liquid water has a surface area in the range 200 to 700 square metres/gram.

5. A process as claimed in claim 4 in which the catalyst before the exposure to liquid water has a mean pore size of at least 10 A.

6. A process as claimed in claim 5 in which the mean pore size of the catalyst is increased during the exposure to liquid water by 20 to 300 A.

7. A process as claimed in claim 6 in which the mean pore size of the catalyst after the exposure to the water is 80 to 250 A.

8. A process as claimed in claim 1 in which a mixture of xylene is isomerised.

9. A process as claimed in claim 8 in which the mixture of xylenes contains less than an equilibrium amount of orthoxylene and is isomerised to produce a product having an increased concentration of orthoxylene.

10. A process as claimed in claim 8 in which the mixture of xylenes contains less than an equilibrium concentration of paraxylene and is isomerised to produce a product having a higher concentration of paraxylene.

11. A process as claimed in claim 10 in which the isomerisation is carried out at a temperature in the range 200 to 600° C.

12. A process as claimed in claim 11 whenever carried out at a pressure of 0.5 to 50 atmospheres.

13. A process as claimed in claim 1 in which at least one xylene containing less than an equilibrium concentration of paraxylene is hydro-isomerised to produce a product having a higher concentration of paraxylene by contacting it with hydrogen in the presence of a catalyst which comprises a noble metal supported on a silica, alumina or silica/alumina support which has been exposed to liquid water at a temperature in excess of 100° C. or to supercritical water at elevated pressure before carrying out the process.

References Cited

UNITED STATES PATENTS

| | | | |
|---|---|---|---|
| 3,200,162 | 8/1965 | Kawai | 260—668 A |
| 3,381,048 | 4/1968 | Lovell et al. | 260—668 A |
| 3,382,189 | 5/1968 | Mitchell et al. | 252—455 |
| 3,420,772 | 1/1969 | Eck et al. | 252—420 |
| 3,422,004 | 1/1969 | Padrta | 252—420 |

CURTIS R. DAVIS, Primary Examiner

U.S. Cl. X.R.

252—420, 455 R

UNITED STATES PATENT OFFICE

CERTIFICATE OF CORRECTION

Patent No. 3,836,594 Dated September 17, 1974

Inventor(s) Roy John Sampson et al

It is certified that error appears in the above-identified patent and that said Letters Patent are hereby corrected as shown below:

IN THE HEADING:

After "Roy John Sampson and Ivan James Samuel Lake, both of Norton Hall, The Green, Norton, Stockton-on-Tees, England" insert --, assignors to Imperial Chemical Industries Limited, of London, England--.

At Column 6, line 50, correct "Paraxylene plus metaxylene toluene" to read --$\frac{\text{p-xylene + m-xylene}}{\text{toluene}}$--.

At Column 6, line 60, after "treatment" insert --is periodically employed to remove deposits--.

At Column 7, line 32, change "$1/hr^{-1}$" to read --1/hr--.

At Column 7, line 54, the heading "Surface area, $m.^2g.^{-1}$" should be placed at the left-hand margin of Column 7, line 54.

At Column 7, line 63, correct "Percent isomerisation; percent disproportionation plus percent hydrodealkylation" to read --

$$\frac{\text{Percent Isomerisation}}{\text{Percent Disproportionation} + \text{Percent Hydrodealkylation}}$$

--

After Column 7, line 66, insert --A. as set forth herein refers to angstrom units.--

At Column 8, line 28, "xylene" should read --xylenes--.

Signed and Sealed this

Twenty-first Day of September 1976

[SEAL]

Attest:

RUTH C. MASON
*Attesting Officer*

C. MARSHALL DANN
*Commissioner of Patents and Trademarks*